W. H. BARWICK.
Combined Ice-Tool.
No. 205,169. Patented June 25, 1878.
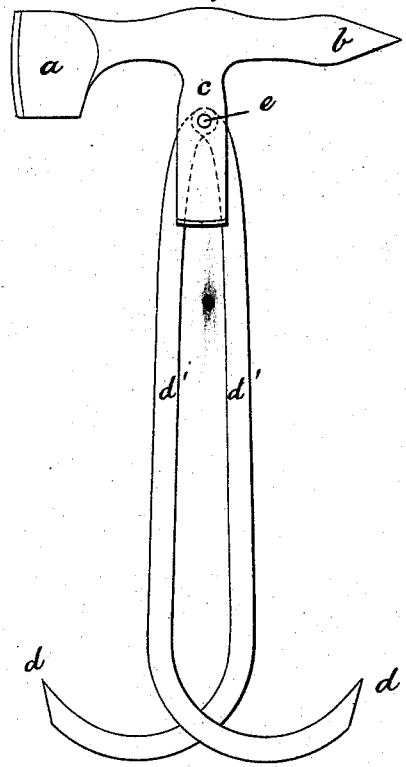
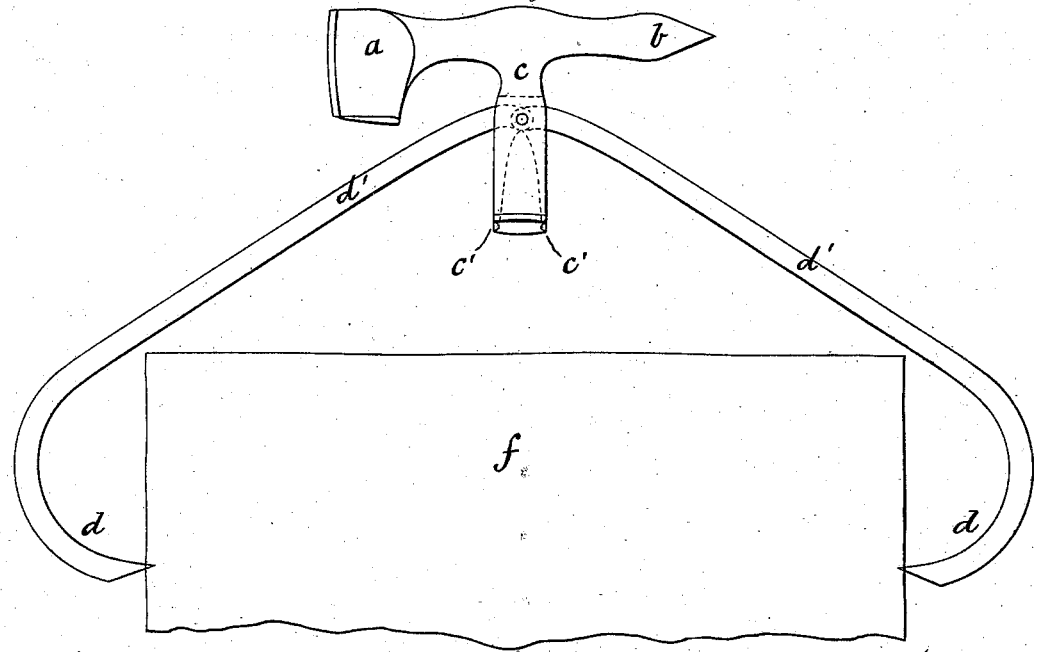

UNITED STATES PATENT OFFICE.

WILLIAM H. BARWICK, OF HYDE PARK, MASSACHUSETTS.

IMPROVEMENT IN COMBINED ICE-TOOLS.

Specification forming part of Letters Patent No. 205,169, dated June 25, 1878; application filed May 24, 1878.

*To all whom it may concern:*

Be it known that I, WILLIAM HENRY BARWICK, of Hyde Park, in the county of Norfolk and State of Massachusetts, have invented a new and useful Improvement in Ice-Tools, which improvement is fully set forth in the following specification, reference being had to the accompanying drawings.

My invention relates to improvements in ice-tools, consisting of the combination of hatchet, pick, and tongs, arranged together to form one tool, as follows: The head of the tool is made in one end as a hatchet, and in the opposite end as a pick, midway between which is, projecting downward, a shank-piece, to which the upper ends of the blades of the tongs are hinged by means of a pin or bolt passing through the said shank and blades. When the said blades are folded together they form a convenient handle, by which the hatchet and pick are manipulated. For the purpose of steadying the blades when used as the handle aforesaid, I provide the shank to which they are jointed with a pair of notches on two opposite sides thereof, in which the upper ends of the blades of the tongs are resting when they are used as a handle for the hatchet and pick. The shank with its hatchet and pick forms a convenient handle to raise or transport ice held between the extended sharp ends of the tongs.

The whole is a very strong, cheap, and durable combination ice-tool, embodying a hatchet, pick, and a pair of tongs in one single tool, the blade of the tongs forming a handle for the hatchet and pick, and the latter forming a handle for the tongs, as described.

The hatchet and pick may be arranged parallel with, oblique, or at right angles to, the tongs without departing from the spirit of my invention.

On the accompanying drawings, Figure 1 represents a side elevation of my improved tool, the blades of the tongs being closed together; and Fig. 2 represents a similar view with the tongs extended.

Similar letters refer to similar parts wherever they occur on the different parts of the drawings.

The head of the tool is composed of the hatchet $a$ and pick $b$, and the downward-projecting shank $c$, as shown. $d\ d$ represent the tongs, of which $d'\ d'$ are the blades, the upper ends of which are jointed to the shank $c$ by means of the hinge-pin $e$, as shown.

$c'\ c'$ are the notches on two opposite sides of the shank $c$ for the reception and steadying of the upper ends of the blades $d'\ d'$ when the latter are folded together to serve as a handle for the hatchet and pick, as represented in Fig. 1.

In Fig. 2, $f$ represents a piece or cake of ice held between the points of the tongs $d\ d$, in which position the hatchet $a$ and pick $b$ serve as a handle for the tongs.

Having thus fully described the nature, construction, and operation of my invention, I wish to secure by Letters Patent, and claim—

The herein-described combination ice-tool, consisting of the hatchet $a$, pick $b$, and jointed tongs $d\ d\ d'\ d'$, as and for the purpose set forth.

WILLIAM HENRY BARWICK.

Witnesses:
ALBAN ANDRÉN,
J. W. CALEF.